United States Patent [19]

Allen et al.

[11] Patent Number: 4,482,630

[45] Date of Patent: Nov. 13, 1984

[54] SILICONATE-COATED ENZYME

[75] Inventors: Edwin Allen, Oupeye; Alan Dillarstone, Rocourt; Joseph A. Reul, Heusy, all of Belgium

[73] Assignee: Colgate-Palmolive Company, New York, N.Y.

[21] Appl. No.: 554,094

[22] Filed: Nov. 21, 1983

Related U.S. Application Data

[62] Division of Ser. No. 366,713, Apr. 8, 1982, Pat. No. 4,421,657.

[51] Int. Cl.[3] ........................ C09K 3/18; C11D 3/386; C11D 17/06

[52] U.S. Cl. ...................................... 435/187; 252/90; 252/132; 252/174; 252/174.12; 252/174.13; 252/384; 252/385; 252/DIG. 12; 435/183; 435/188

[58] Field of Search ............ 252/90, 132, 174, 174.12, 252/174.13, DIG. 12; 435/183, 187, 188

[56] References Cited

U.S. PATENT DOCUMENTS

| | | | |
|---|---|---|---|
| 3,852,211 | 12/1974 | Ohren | 252/110 |
| 3,915,882 | 10/1975 | Nirschl | 252/131 |
| 3,966,629 | 6/1976 | Dumbrell | 252/140 |
| 4,013,574 | 3/1977 | Leikhim | 252/174.15 |
| 4,139,546 | 2/1979 | Berger | 252/174.15 |
| 4,196,104 | 3/1980 | Oguagha | 252/542 |
| 4,264,465 | 4/1981 | Abel | 252/99 |

OTHER PUBLICATIONS

"Rhodorsil Siliconate 51T", Bulletin No. B-10-03 Published By Rhone-Poalence, Dec. 1975, 4 pages.

*Primary Examiner*—Dennis L. Albrecht
*Attorney, Agent, or Firm*—Herbert S. Sylvester; Murray M. Grill; John A. Stemwedel

[57] ABSTRACT

Enzyme particles are coated or at least partially coated with a salt of a lower alkyl siliconic acid and/or polymerization product(s) thereof which may be formed from such acid on storage. The coated enzyme particles are useful as components of heavy duty fabric softening laundry detergent compositions, such as those which contain bentonite to soften laundry. The coating material, which may be more simply referred to as the siliconate, assists in stabilizing the enzyme when such is incorporated in detergent compositions, helps to prevent adherence of the coated particles to container or compartment walls and can aid in controlling the foaming activity of the built synthetic organic detergents.

2 Claims, No Drawings

SILICONATE-COATED ENZYME

This is a division of application Ser. No. 366,713, filed Apr. 8, 1982, which is now U.S. Pat. No. 4,421,657, which was issued on Dec. 20, 1983.

This invention relates to detergent compositions. More particularly, it relates to particulate heavy duty laundering and textile softening detergent compositions intended for use in the machine washing of laundry. It also relates to methods for the manufacture of such compositions.

Heavy duty detergent compositions useful for machine washing of textiles are everyday household products, widely employed throughout the world in home laundry applications. Such products, often based on a synthetic organic detergent (or sometimes a "natural" soap) and a "builder", are usually economical and of good soil removing capabilities. However, cotton and various other fibrous materials tend to become hard (or lose their desired degrees of softness) after repeated washing and drying, especially when such drying is effected by hanging the wash on a clothesline.

It has been found that various quaternary ammonium halides and other cation-active compounds tend to adhere to and exert a softening effect on washed fibrous goods but such are sometimes considered to be disadvantageous because of continuing buildups of deposits of hydrophobic moieties thereof on the washed materials, with the eventual objectionable development of water repelling properties by the textile and consequent loss of desirable moisture absorption capability. Also, such repeatedly washed laundry can develop a fatty or greasy feeling and may become noticeably water repellent. Fatty deposits also often tend to hold dirt or soil deposits more strongly to textiles on which they are present, and thus the inclusion of cationic materials in the detergent composition can be counterproductive.

As was indicated above, quaternary ammonium halide softening compounds can have negative effects on the washed laundry, but it has been found that certain clays of the bentonite type tend to make washed laundry feel softer to the touch while still not producing objectionable hydrophobic properties in the laundered materials. It has been shown that bentonite can sometimes even increase the moisture absorption rate of fabrics, and it also acts as a builder for detergents and as a soil suspending aid. For example, it appears that nine parts of bentonite are the equivalent of about one part of sodium tripolyphosphate, as a builder for organic detergents. The bentonite particles, which become held to the fibers of the laundry, act to lubricate such fibers and thereby make them feel soft. Because the particles are small in size and apparently are of desirable optical characteristics, they do not objectionably lighten or discolor the fabrics to which they are adherent, and deposits thereof do not accumulate to an objectionable extent despite repeated washings with bentonite-containing detergent compositions.

Although bentonite is advantageous as a softening agent in detergents, and although the softening properties of the bentonite and its adherence to substrates may be related to its "gelling" characteristics, it is considered that such gelling properties can cause an objectionable gumminess in the detergent, which could hold detergent beads and/or bentonite beads or agglomerates to surfaces, thereby tending to inhibit free flow thereof. Thus, under conditions of high humidity or in the presence of free moisture bentonite could "gel" and become sticky or of reduced flowability, even becoming held to passageway or chamber walls despite applications of forces to the particles to remove them (such as the force of flowing water being charged to an automatic washing machine). Such adherence could be significantly disadvantageous for a desirably free flowing commercial particulate detergent product and could lead to a lesser degree of acceptance of the product by the consumer. Even when flowability through production lines during the manufacturing and packaging processes, and flowability from the dispensing carton when the product is being employed by the ultimate consumer are satisfactory, the presence of bentonite can cause the detergent composition particles to be held to appliance part walls, especially charging compartment walls, when such particles and the bentonite present are moistened. In such circumstances the bentonite may tend to swell, with the production of moist adherent surfaces, so that the particles may resist removal from surfaces against which they are resting. For example, in washing machines and other appliances equipped with automatic dispensers or charging compartments, the detergent particles may not entirely fall from the dispenser or be washed out of the dispenser (usually by the water being charged to the dispenser), especially if the dispenser walls had been wet before addition of the detergent. Failure to dispense part of the desired charge to the washing machine diminishes the effective detergent and softener concentrations of the wash water and can lead to inaccurate detergent and softener concentrations being employed. Also, it may create an unsightly buildup, which may be objectionable to the consumer. In either situation the result is undesirable and should be avoided, if possible.

Bentonite has been taught to be a useful component of detergent compositions for many years. British patent specification Nos. 404,413 and 461,221 disclose that clotheswashing compositions containing bentonite, synthetic anionic detergent and builder salt "give to fabrics washed therewith a full feel and a soft handle". Bentonites have a long history of use in soap and detergent products as fillers and bodying agents and it has also been recognized that fabrics are softened by the deposition of bentonite thereon from aqueous baths; see U.S. Pat. No. 3,594,212. Various such applications of bentonite and other suitable clays have also been described in the more recent patent art. For examples, various softening uses are described in British patent specifications Nos. 1,404,898; 1,401,726; 1,455,873; 1,460,616; 1,572,815; U.S. Pat. Nos. 3,936,537; 4,141,847; and UK patent application No. 2,063,289. However, it does not appear that any of the disclosures mentions incorporation of water soluble siliconate with bentonite in a free flowing heavy duty detergent composition to improve the resistance of the bentonite to adherence to containing walls of dispensers or charging compartments of end-use washing machines or storage and transportation equipment. Also, it does not appear that any of the disclosures mentions the use of a siliconate or suitable derivative for treating bentonite agglomerates or bentonite-containing particulate detergents or other components of such particulate detergent compositions to improve their physical properties, surface characteristics, structural integrity and/or stability on storage.

In accordance with the present invention a heavy duty laundering and textile softening particulate detergent composition, useful for automatic machine washing of laundry in water and dispensable from a charging or dispensing compartment of such a machine by action of water being fed through such compartment, comprises a built synthetic organic detergent selected from the group consisting of anionic and nonionic detergents and mixtures thereof, a building proportion of a builder for the synthetic organic detergent selected from the group consisting of water soluble and water insoluble builders and mixtures thereof, and a softening proportion of bentonite, with the bentonite being in particles with which there is included a dispensing assisting proportion of a siliconate and/or a dispensing assisting derivative thereof such as a salt of a lower alkyl siliconic acid and/or polymerization product(s) thereof formed therefrom on storage. In preferred embodiments of the invention the synthetic organic detergent includes both an anionic detergent, which is preferably a sodium linear higher alkylbenzene sulfonate, and a nonionic detergent, which is preferably a condensation product of a higher fatty alcohol and polyethylene oxide, a higher fatty acid soap is present, the builder salt is primarily pentasodium tripolyphosphate or NTA or a mixture thereof, with a small proportion of sodium silicate, the bentonite is a swelling bentonite of a moisture content of at least 3%, the siliconate is an alkali metal lower alkyl siliconate, more preferably potassium methyl siliconate, and 5 to 35% of a bleaching agent which releases oxygen in aqueous solution at elevated temperature, such as sodium perborate, is present. Also within the invention are methods for making the improved products that have been described herein.

The synthetic organic detergent(s) employed will normally be either nonionic or anionic and very preferably will be a combination of both, but suitable amphoteric or ampholytic detergents, such as those sold under the Miranol trademark, may also be used in conjunction with nonionics and anionics in the present compositions. Cationic detergents, such as the quaternary ammonium halides, e.g., those sold under the Arosurf trademark, can also serve as supplementary fabric softeners in these products but normally will not be used, and if they are present, will not be spray dried with any anionic detergent, due to an undesirable ihteraction that can take place. These classes of materials are well known and have been described repeatedly in the detergent art. Because they are not preferred components of the present compositions no further description thereof in this specification is considered to be appropriate.

Various synthetic anionic organic detergents, such as those characterized as sulfonates and sulfates, usually as alkali metal or sodium salts, may be employed, but those which are most preferred are linear higher alkyl benzene sulfonates, higher alkyl or fatty alcohol sulfates and higher fatty alcohol polyethoxy or polyethoxylate sulfates Preferably, in the higher alkyl benzene sulfonates the higher alkyl is linear and of 10 to 14 carbon atoms, more preferably 11 to 13, e.g., 12, and the sulfonate is a sodium salt. The alkyl sulfate is preferably a higher fatty alkyl or alcohol sulfate of 10 to 16 carbon atoms, more preferably 12 to 14 carbon atoms, e.g., 12, and is also employed as the sodium salt. The higher fatty alcohol polyethoxy sulfates will preferably be of 10 to 18 carbon atoms, more preferably 12 to 16, e.g., 12, in the higher fatty alcohol, the ethoxy content will preferably be from 3 to 30 ethoxy groups per mol, more preferably 3 or 5 to 20, and the detergent will be a salt of sodium. Thus, it will be seen that the alkyls of the sulfonates and sulfates are preferably linear or fatty higher alkyls of 10 to 18 carbon atoms, the cation is preferably sodium, and when a polyethoxy chain is present the sulfate is at the end thereof. Other useful anionic detergents include the higher olefin sulfonates and paraffin sulfonates, e.g., the sodium salts wherein the olefin or paraffin groups are of 10 to 18 carbon atoms. Specific examples of the preferred detergents are sodium dodecyl benzene sulfonate, sodium tallow alcohol polyethoxy (3 EtO) sulfate, and sodium hydrogenated tallow alcohol sulfate. In addition to the preferred anionic detergents mentioned, others of this well known group may also be present, especially in only minor proportions with respect to those previously described. Also, mixtures thereof may be employed and in some cases such mixtures can be superior to single detergents. The various anionic detergents are well known in the art and are described at length at pages 25 to 138 of the text *Surface Active Agents and Detergents,* Vol. II, by Schwartz, Perry and Berch, published in 1958 by Interscience Publishers, Inc.

Although various nonionic detergents of satisfactory physical characteristics may be utilized, including condensation products of ethylene oxide and propylene oxide with each other and with hydroxy-containing aromatic and aliphatic bases, such as nonyl phenol and Oxo-type alcohols, it is highly preferred that the nonionic detergent be a higher fatty alkoxy poly-lower alkoxy lower alkanol, which may also be described as a condensation product of ethylene oxide (and/or propylene oxide) and higher fatty alcohol. In such products the higher fatty alkoxy or alcohol is of 10 to 16 carbon atoms, preferably 12 to 15 carbon atoms, and the nonionic detergent contains from about 3 to 20 lower alkoxy groups, preferably 5 to 15, and more preferably 9 to 13 ethylene oxide groups per mol, e.g., 11.

The builder for the synthetic organic detergent, which helps to improve the washing action of the detergent, is either a water soluble or a water insoluble builder or a mixture thereof. Of course, mixtures of water soluble builders may also be utilized, e.g., polyphosphate and NTA (nitrilotriacetic acid salt, normally the sodium salt), but of the water insoluble builders usually only the zeolites will be present, although mixtures of such zeolites may also be found to be advantangeous. While zeolites are useful components of the present compositions, generally it will be preferable to employ water soluble builder(s) and often such will be the only builder(s) present.

The water soluble builder or mixture thereof employed may be one or more of the conventional materials that have been used as builders or suggested for such purpose. These include inorganic and organic builders, and mixtures thereof. Among the inorganic builders those of preference are the various phosphates, preferably polyphosphates, e.g., tripolyphosphates and pyrophosphates, such as pentasodium tripolyphosphate and tetrasodium pyrophosphate. Trisodium nitrilotriacetate (NTA), preferably employed as the monohydrate, and other nitrilotriacetates, such as disodium nitrilotriacetate, are preferred organic builders. The designation NTA, which normally stands for nitrilotriacetic acid, in this specification is employed to also refer to the various salts thereof, preferably the alkali metal salts and most preferably the trisodium salt. Sodium tripolyphosphate, sodium pyrophosphate and NTA may be utilized in hydrated forms, which are often preferred, but anhydrous forms may also be used. Of course, carbonates, such as sodium carbonate, are useful builders and may desirably be employed, alone or in conjunction with bicarbonates, such as sodium bicarbonate. When the polyphosphates are employed it may be preferred to have sodium pyrophosphate present with sodium tripolyphosphate in proportion from 1:10 to 10:1, preferably 1:5 to 5:1 with respect to it, with the total proportion of both builders being about the same as that mentioned herein for the sodium tripolyphosphate. Other water soluble builders that are considered to be effective include the various other inorganic and organic phosphates, borates, e.g., borax, citrates, gluconates, EDTA and iminodiacetates. Preferably the various builders will be in the forms of their alkali metal salts, either the sodium or potassium salts, or a mixture thereof, but sodium salts are normally more preferred. In some instances, as when neutral or slightly acidic detergent compositions are being produced, acid forms of the builders, especially of the organic builders, may be preferable but normally the salts will either be neutral or basic in nature. The silicates, preferably sodium silicate of $Na_2O:SiO_2$ ratio within the range of 1:1.6 to 1:3.0, preferably 1:2 to 1:2.8, e.g., 1:2.35 or 1:2.4, also serve as builder salts but because of their strong binding properties and because they could promote objectionable adherence of detergent particles to dispenser walls they are considered to be special cases of builders, and relatively small proportions thereof will be present (such proportions will be described separately from the other builders). When it is desired for greater proportions of silicate to be in the detergent composition it may be preferable for hydrated sodium silicate particles to be post-added to spray dried particles containing other builder(s).

The water insoluble builders, as that term is employed in the present specification, are those which help to improve the detergency of synthetic organic detergents, especially that of synthetic anionic organic detergents, and in such cases the mechanism for increasing detergency appears to be related to water softening effects of the builder, such as calcium and/or magnesium ion removal from the wash water, usually by an ion exchange mechanism. While it is within the invention to utilize water insoluble builders other than the zeolites, as a practical matter, at the present time, the zeolites are the principal such insoluble builders that are used.

The zeolites employed include crystalline, amorphous and mixed crystalline-amorphous zeolites, of both natural and synthetic origins. Preferably, such materials are capable of reacting sufficiently rapidly with calcium ions so that, alone or in conjunction with other water softening compounds in the detergent, they soften the wash water before adverse reactions of such ions with other components of the synthetic organic detergent composition occur. The zeolites employed may be characterized as having a high exchange capacity for calcium ion, which is normally from about 200 to 400 or more milligram equivalents of calcium carbonate hardness per gram of the aluminosilicate, preferably 250 to 350 mg. eq./g.

Although other ion exchanging zeolites may also be utilized, normally the finely divided synthetic zeolite builder particles employed in the practice of this invention will be of the formula $$(Na_2O)_x.(Al_2O_3)_y.(SiO_2)_z.w\ H_2O,$$

wherein x is 1, y is from 0.8 to 1.2, preferably about 1, z is from 1.5 to 3.5, preferably 2 to 3 or about 2, and w is from 0 to 9, preferably 2.5 to 6. The zeolite should be a univalent cation-exchanging zeolite, i.e., it should be an aluminosilicate of a univalent cation such as sodium or potassium.

Crystalline types of zeolites utilizable as good ion exchangers in the invention, at least in part, include zeolites of the following crystal structure groups: A, X, Y, L, mordenite and erionite, of which types A, X and Y are preferred. Mixtures of such molecular sieve type zeolites can also be useful, especially when type A zeolite is present. These crystalline types of zeolites are well known in the art and are more particuarly described in the text *Zeolite Molecular Sieves,* by Donald W. Breck, published in 1974 by John Wiley & Sons. Typical commercially available zeolites of the aforementioned structural types are listed in Table 9.6 at pages 747–749 of the Breck text, which table is incorporated herein by reference. Also, suitable zeolites have been described in many patents in recent years for use as detergent composition builders.

Crystalline zeolites of ion exchanging and water softening properties that are preferred are those which are in hydrated or water loaded form, containing bound water in an amount from about 4% up to about 36% of the zeolite total weight, depending on the type of zeolite used, and are preferably hydrated to about 15 to 70% of their capacities. Normally, water contents are in the range of about 5 to 30%, preferably about 10 or 15 to 25%, such as 17 to 22%, e.g., 20%.

Preferably the zeolite should be in a finely divided state, with the ultimate particle diameters being up to 20 microns, e.g., 0.005 or 0.01 to 20 microns, more preferably being from 0.01 to 15 microns, e.g., 3 to 12 microns, and especially preferably being of 0.01 to 8 microns mean particle size, e.g., 3 to 7 microns, if crystalline, and 0.01 to 0.1 micron, e.g., 0.01 to 0.05 micron, if amorphous. Although the ultimate particle sizes are much lower, usually the zeolite particles will be of sizes within the range of No's. 100 to 400 sieves, preferably 140 to 325. However, they may sometimes be agglomerated, separately or with spray dried detergent composition particles, to sizes like those of the particles, for example, ±10 or 25%.

Although sodium sulfate and sodium chloride and other filler salts possess no building properties they are sometimes utilized in detergent compositions for filling characteristics, and sodium sulfate is especially useful as a processing aid. In addition to increasing the volume and weight of the product to facilitate measuring, they also sometimes improve bead stabilities and physical properties of the detergent composition beads in which they are incorporated. Nevertheless, because the present compositions are satisfactory without any fillers being present, such are often preferably avoided entirely or any proportion thereof present is minimized, usually to a practical minimum.

The softening clay that is an important component of the prescnt detergent compositions is of the type characterized as "bentonite". Bentonites are colloidal clays (aluminum silicates) containing montmorillonite. They are of varying compositions and are obtainable from natural deposits in many countries, including Italy, Spain, U.S.S.R., Canada and the United States (principally Wyoming, Mississippi and Texas). The bentonites which are useful in accordance with the present invention are those which have "lubricating" and dispersing properties, which are associated with swelling capacity in water. Although some bentonites, principally those which may be characterized as calcium (or magnesium) bentonites, have low or negligible swelling capacities, these may be converted or "activated" so as to increase such swelling capacity. Such conversion may be effected by appropriate treatment with alkaline material, preferably aqueous sodium carbonate solution, in a manner known in the art, to insert sodium (or potassium) into the clay structure. In addition to improving the swelling capacity of the bentonite, which benefits fabric softening and dispersing capabilities thereof, the sodium carbonate solution treatment of the nonswelling clay or poorly flowing clay replaces, for example, 5 to 100%, 10 to 90% or 15 to 50% thereof, with sodium, and thereby improves the exchange capacity of the clay for water hardness ions, such as those of calcium and magnesium. The resulting byproducts, calcium carbonate and magnesium carbonate, are left with the bentonite, and appear to have desirable adjuvant properties in the final products.

Although ion exchange capacities of bentonites have been mentioned in the patent literature as being relevant to softening capacity, it is a feature of the present invention that good textile softening is obtainable with sodium bentonites of comparatively low ion exchange capacities. Whether the swelling bentonite (also called sodium bentonite herein) is a naturally occurring clay or is obtained by alkali treatment of a non-swelling or poorly swelling bentonite, it may be used in the present textile softening detergent compositions. Treated Italian bentonites have been found to be especially useful and are considered most appropriate for products intended for European markets. For American markets Wyoming bentonite is often preferable and such does not have to be treated because it already contains sodium ion in the bentonite structure and has swelling properties. Analysis of a typical Italian bentonite (after alkali treatment) shows that it contains 66.2% of $SiO_2$, 17.9% of $Al_2O_3$, 2.80% of MgO, 2.43% of $Na_2O$, 1.26% of $Fe_2O_3$, 1.15% of CaO, 0.14% of $TiO_2$ and 0.13% of $K_2O$. A typical Wyoming or western bentonite (untreated) contains from 64.8 to 73.0% of $SiO_2$, 14 to 18% of $Al_2O_3$, 1.6 to 2.7% of MgO, 0.8 to 2.8% of $Na_2O$, 2.3 to 3.4% of $Fe_2O_3$, 1.3 to 3.1% of CaO and 0.4 to 7.0% of $K_2O$. Thus, it is seen that the compositions of the bentonites are quite different although both types have swelling properties. It is considered that if the $Na_2O$ content of the clay is at least about 0.5%, preferably at least 1% and more preferably at least 2% (the equivalent proportion of $K_2O$ may also be taken into account) the clay will be satisfactorily swelling for the purposes of the present invention, with satisfactory softening and dispersing properties in aqueous suspension. While it is expected that proportions of the various constituents of the swelling bentonites (which may herein be referred to as sodium bentonites, whether natural or "activated") within the ranges between the typical analyses given will result in useful components of the present compositions, it is also considered that the percentages of the components of the natural swelling bentonite may be raised or lowered about 10% and that the typical analysis of the treated bentonite may be expanded $\pm 10\%$, with the bentonites within those ranges still being useful. Additionally, other swelling bentonites may be substituted, at least in part. Generally the useful bentonites will have swelling capacities of at least 1 or 2 milliliters per gram, more preferably at least 5 or 10 ml./g. Of course, higher swelling capacity bentonites will also be useful. Normally the range of swelling capacities will be from 5 to 30 ml./g. and frequently will be in the 5 to 20 ml./g. range.

The sodium bentonite or swelling bentonite will normally be agglomerated before being blended with spray dried built detergent beads and any other adjuvants to be post-added. Such agglomeration will be carried out in known manner, as by utilizing moisture spray application to tumbling bentonite powder, extrusion, compaction, pan agglomeration or other technique. However, it is highly desirable that the bentonite be in finely divided powder form before agglomeration so that when the agglomerate breaks up in the wash water the particles of bentonite will be small enough to be effective lubricants, as deposited on the laundry. Thus, it will normally be desirable for essentially all of the bentonite powder, before agglomeration, to pass through a No. 100 sieve (U.S. Sieve Series), with at least 99% passing such a sieve and with over a major proportion thereof passing through a No. 200 sieve, preferably with less than about 30% by weight of the particles failing to pass through such a sieve and more preferably with no more than 20% resting on such sieve.

Also important to promote ready break-ups of bentonite agglomerates and dispersion in the wash water so that the minute particles thereof may be adhered to textile fibers to soften them, is the moisture content of the bentonite. Although it is desirable to limit the free moisture content of the bentonite utilized to about 10% or so, with moisture contents above 15% not normally being employed, it is even more important to make certain that the bentonite includes enough free moisture, most of which is considered to be present between adjacent plates of the bentonite, to facilitate quick disintegration of the bentonite and any adjacent materials in the particles when such particles or detergent compositions containing them are brought into contact with water, such as wash water. It has been found that at least about 2%, preferably at least 3% and more preferably, about 4% or more of water should be present in the bentonite (socalled "internal" moisture), and that the bentonite should not be dried so that less than such percentages of water are even temporarily present in it. In other words, overdrying to the point where the bentonite loses its internal moisture can significantly diminish the utility of the present compositions. When the bentonite moisture content is too low the bentonite does not aid in satisfactorily swelling and disintegrating the agglomerated beads in the wash water.

Preferred swelling bentonites of the types described above are sold under the trade marks Laviosa and Winkelmann, e.g., Laviosa AGB and Winkelmann G 13, both of which are treated Italian bentonites, and Mineral Colloid No. 101 (and other similar designations) corresponding to Thixo-Gels No's. 1, 2, 3 and 4 (marketed by Benton Clay Company, an affiliate of Georgia Kaolin Co.). As will be described later, the treated bentonites will also preferably be free of grit and will preferably have been further processed by grinding to a fine powder before agglomeration. Usually the commercial bentonite used will have a pH in water (at 6% concentration) in the range of 8 to 9.4, a maximum free moisture content of about 8%, a specific gravity of about 2.6 and a viscosity, at 10% concentration in water, within the range of 5 to 30 centipoises, preferably 10 to 30 cp.

The siliconate, which is employed in conjunction with the bentonite, preferably to coat it, and also can be used to coat the detergent composition particles, and which acts to inhibit sticking of the bentonite and the detergent to charging compartment walls of an automatic washing machine (and to walls of other "containers" for the product), is one which may be easily applied to the bentonite and which can at least partially coat the particles thereof and inhibit their adhesion to walls of a compartment in which they may be stored temporarily, even when such walls are damp or wet. The siliconate is a salt of siliconic acid, preferably an alkali metal salt thereof, and the siliconic acid is preferably a lower alkyl siliconic acid. While it is desirable that the salt-forming metal or other cation be one which will produce a water soluble siliconate, so that it may be applied to the bentonite in aqueous solution, such may not be necessary and it is contemplated that water dispersible siliconates will also be utilized. Furthermore, it is within the invention to employ lipophilic siliconates, which may be applied in organic solvent solution or in aqueous organic solvent solution, or in corresponding emulsions or dipersions. The alkali metal of the siliconate is preferably either sodium or potassium, but other salt-forming cations may also be utilized providing that the siliconate is suitable for the present purposes. It is contemplated that other alkali metal salts of siliconic acids than the lower alkyl siliconates may be utilized, including both aliphatic and aromatic siliconates, but the lower alkyl siliconates, wherein the lower alkyl is of 1 to 3 or 4 carbon atoms, e.g., potassium methyl siliconate and sodium propyl siliconate, are considered as preferred. Instead of employing the siliconate an equivalent charge of the corresponding siliconic acid and the corresponding base may be utilized.

For most effective results it is much preferred to employ the lower alkyl siliconates previously described but it is recognized that such compounds may polymerize, at least partially, to siliconic or other film-forming and foam-inhibiting compounds or polymers and accordingly it is within the broader bounds of this invention to utilize such "derivative" materials directly, at least in part, as a component of the present detergent compositions. When such a derivative of the siliconate is employed it will be one which aids in improving the dispensing of the bentonite beads or detergent composition particles from a charging compartment of an automatic washing machine, such as a compartment wherein the particulate contents are washed out by the flow of water into the washing tub of the machine.

Although the operation of the present invention should not be considered to be limited by the mechanism to be described, it may well be that the water soluble alkali metal lower alkyl siliconates (which may also be described as alkali metal lower alkyl silanolates), may be converted to polymethyl siloxanes, as by the action of atmospheric carbon dioxide or other acidic acting material, which could also result in the production of alkali metal carbonate, such as sodium carbonate, a useful builder salt. The polymethyl siloxanes are known to be hydrophobic and it is possible that their presence is the cause of the improved properties of the coated bentonite (or other detergent particles) with respect to being of improved dispensing properties from the charging compartment of an automatic washing machine. The production of siloxanes by the described reaction has been mentioned in the text *Chemistry and Technology of Silicones,* by Walter Noll, published by Academic Press in 1968. However, although silicones have been included in detergent compositions in the past, often for their anti-foaming properties, no disclosure of the use of water soluble siliconates to coat bentonite and detergent particles to promote free release from damp surfaces of charging compartments, as in the present invention, is known to the present applicants, and such process and the resulting compositions are considered to be unobvious from the prior art.

The water soluble soap, which is a desirable component of the present detergent compositions and which has a useful foam limiting action in the wash water, which is especially advantageous for side loading or horizontal tub washing machines, is normally a higher fatty acid soap of alkali metal, such as sodium or potassium, with sodium soaps being highly preferred. Such soaps are well known and need not be described at length. Suffice it to say that they may be made from natural fats and oils, such as those from animal fats and greases and from vegetable and seed oils, for example, tallow, hydrogenated tallow, coconut oil, palm kernel oil, and corresponding "natural" and synthetic fatty acids, and that they are normally of 10 to 24 carbon atoms, preferably 14 to 18 carbon atoms. Preferably such soaps are of hydrogenated tallow or hydrogenated tallow fatty acids, e.g., stearic acid. The water soluble soap which may be included in the present compositions will preferably be chosen so as to have a desirable balance of good detergent properties, effective foam reducing effect and other good physical properties. Specifically, among those other physical properties will be desirable hardness, good binding effect and limited tendency to produce adhesive gels under use conditions (in the washing machine charging compartment). It has been found that the sodium hydrogenated tallow soaps satisfy these conditions best but even compositions containing them are desirably also treated with siliconate to further inhibit adhesion to damp compartment walls. Of course, for compositions wherein foaming is desirable soap content is omitted or lowered or a lower fatty acid soap, e.g., sodium laurate, may be used instead.

Bleaching agents do not have to be incorporated in all of the detergent compositions of this invention but for best cleaning and whitening of laundry it is often preferable that a bleach be employed. When the wash water temperature in the automatic washing machine is high enough sodium perborate is the bleaching agent of choice because the elevated temperature, especially when it is above 80° C. (and it may be almost up to the boiling point, e.g., 90° or 95° C.)can cause decomposition of the perborate and release of bleaching oxygen from it. Thus, under such conditions the sodium perborate, which is often referred to as sodium perborate tetrahydrate or sodium borate perhydrate, and which will usually have an active oxygen content of at least about 10%, releases such oxygen without the need for employment of an activating agent or decomposition catalyst. When lower temperature laundering is undertaken, either in cold water or hot water, for example, at temperatures from 20° C. to 60° C., the sodium perborate will not usually sufficiently decompose to satisfactorily bleach textiles being washed and in such circumstances an activator will be employed or another suitable bleaching agent will be used, also usually with an activator. Many such systems have been described in the literature, most of which belong to the class of peroxygen compounds, such as persulfuric acid, peracetic acid, performic acid, perphthalic and perbenzoic acid, and salts thereof, such as the alkali metal and alkaline earth metal salts, e.g., sodium and magnesium salts. Various activators for such compositions are known which promote the controlled release of oxygen from them in hot and cold water systems, included among which activators are heavy metal salts, such as copper salts, and various inorganic and organic compounds, which have been described in the art. Among the lower temperature bleaches that which is preferred is magnesium dimonoperoxyphthalate. Of course, various other oxygen releasing bleaching materials, such as the hydroperoxides, may be employed and in the proper circumstances chlorine releasing bleaching materials can be incorporated in the present detergent compositions.

Various adjuvants may be present in the crutcher mix from which base beads or detergent compositions may be spray dried, or such adjuvants may be post-added, with the decision as to the mode of addition often being determined by the physical properties of the adjuvant, its resistance to heat, its resistance to degradation in the aqueous crutcher medium, and its volatility. Among the adjuvants often employed are enzyme powders, which normally are post-added to the base beads because they are heat sensitive. These may be any of a variety of commercially available products, included among which are Alcalase, manufactured by Novo Industri, A/S, and Maxatase, both of which are alkaline proteases (subtilisin). Among specific enzyme preparations that may be employed are Novo Alcalase 2M (2 Anson units per gram) and Maxatase P 440,000. Although the alkaline proteases are most frequently employed, amylolytic enzymes, such as alpha-amylase, may also be utilized. The mentioned compositions usually contain active enzymes in combination with an inert powdered vehicle, such as sodium or calcium sulfate, and the proportion of active enzyme may vary widely, usually being from 2 to 80% of the commercial preparation. In this specification proportions referred to are of the enzyme preparations, not the active part thereof.

Among the fluorescent brighteners those most commonly employed are the stilbene brighteners, e.g., Tinopal 5 BM, especially in extra concentrated form. Among the stilbene compounds are cotton brighteners, such as those sometimes referred to as CC/DAS brighteners, derived from the reaction product of cyanuric chloride and the disodium salt of diaminostilbene disulfonic acid, including variations thereof with respect to substituents on the triazine and aromatic rings. This class of brighteners is known in the detergent art and will most often be used when bleaching components are not present in the final product. When it is desired for the detergent composition to include a bleach, such as sodium perborate or other oxidizing bleach, bleach stable brighteners may be incorporated in the crutcher mix. Among these there may be mentioned the benzidine sulfone disulfonic acids, naphthotriazolyl stilbene sulfonic acids and benzimidazolyl derivatives. Polyamide brighteners, which also may be present, include aminocoumarin or diphenyl pyrazoline derivatives, and polyester brighteners, which can also be used, include naphthotriazolyl stilbenes. Such brighteners are normally used as their soluble salts, e.g., sodium salts, but they may be charged as the corresponding acids. The cotton brighteners will usually comprise major proportions of the brightener systems employed.

When it is desired that the product made be entirely or partially colored, various suitable dyes and dispersible pigments may be employed. When blue dyes, such as Acilan blue, or pigments, such as ultramarine blue, are utilized they may have a dual effects of serving to color some or all of the detergent composition particles, or particles of components of the detergent composition, and helping to give the washed laundry a desirable bluish tint. Coloring of agglomerated bentonite particles by suitable dyes or pigments may be especially desirable because natural bentonite sometimes may be off-color, so that the agglomerates may be converted from particles that look dirty to those which are of attractive color and appearance.

Perfumes employed, which are usually heat sensitive and may contain volatiles, including a solvent, such as alcohol or a suitable glycol or polyol or hydrocarbon, are normally of synthetic perfumery materials, sometimes mixed with natural components, and generally will include alcohols, aldehydes, terpenes, fixatives and/or other normal perfume components, known in the art.

In addition to the adjuvants mentioned there may also be present flow promoting agents, anti-setting materials employed to prevent premature gelation of the crutcher mix, dispersion aids, anti-redeposition agents and, in some cases, additional softening agents, e.g., cationic softeners such as the quaternary ammonium halides, e.g., dimethyldioctadecyl ammonium chloride. However, as was indicated previously, normally the cationic softening agents will not be employed and if used, they will be post-added.

Of course, water is present in the crutcher from which the spray dried component of the present composition is made, wherein it serves as a medium for dissolving or dispersing the various components of the spray dried beads. Therefore, some water, in both free and hydrate forms, is in the product. Similarly, water may be employed to agglomerate the bentonite and perborate powders and dissolve the siliconate. While it may be preferred to employ deionized water, so that the hardness ion contents thereof may be very low and so that metallic ions that can promote decomposition of any organic materials which may be present will be minimized, city or tap water may be utilized instead and sometimes, for economic or supply reasons, will be used exclusively. Normally the hardness content of such water will be no greater than about 300 parts per million, as calcium carbonate.

The proportions of the various components in the final product of this invention will be such as to result in their being effective as a fabric softening detergent, free flowing and of improved dispensability from a charging compartment of an automatic washing machine by action of wash water passing through such compartment. The proportion of anionic detergent will normally be from 3 to 10% of the final product, preferably 3 to 7% and more preferably 4 to 6%, e.g., 5%. Usually the nonionic detergent content will be from 1 to 5%, preferably 2 to 4%, e.g., 3 or 4%. In those instances when nonionic detergent is not being employed the proportion of anionic detergent may be increased by as much as 5% and in cases in which the anionic detergent is omitted the nonionic detergent content may be increased by up to 10%, providing that the detergent composition remains satisfactorily dispensable. While it is possible for effective detergent compositions to be made without either the anionic or nonionic detergent, such products will not be as useful as preferred compositions of this invention. The builder content will generally be in the range of 20 to 75%, preferably 30 to 50% (and such is often preferably entirely water soluble builder salt) and more preferably 30 to 40%, e.g., about 35%. As was previously indicated, sodium tripolyphosphate and NTA are preferred water soluble builders, which may be the sole builders employed. When they are utilized in mixture the mixture will preferably contain from 10 to 90% of one of them, with the balance being the other such builder, and within such ranges preferred proportions may be 20 to 80% and 40 to 60%, and complementing percentages. Similar ranges of percentages are applicable when the builder is a mixture of water soluble builder salt and water insoluble builder, such as a zeolite.

The bentonite content of the textile softening detergent, preferably in the form of a siliconate coated agglomerate of more finely divided bentonite powder particles, will be a satisfactorily softening proportion thereof, which usually will be within the range of 5 to 25%, preferably 10 to 20%, more preferably 14 to 18%, e.g., about 16%. The siliconate used will be employed in a proportion sufficient to have the desired dispensing assisting effect and such proportion will normally be from 0.05 to 1%, although up to 3% can be employed. A preferred range of proportions of the siliconate is from 0.1 to 0.3%, for example, 0.15%. When a fatty acid soap is present the proportion thereof will usually be no greater than 10%. A preferred range of soap contents is from 2 to 6%, more preferably from 2 to 4%, e.g., 3%. When a bleaching agent is present the proportion thereof will usually be within the range of 5 to 35%, preferably 15 to 25%, e.g., 20%. However, it will be kept in mind that such proportions are based on employment of sodium perborate and will be modified when other oxidizing agents are utilized, so as to have approximately the same bleaching effect (or active oxygen content). The moisture content of the product, which does not include hydrate moisture which is not removable during the standard heating at 105° C. for two hours, will usually be within the range of 3 to 20%, with the higher percentages thereof being permissible when a substantial proportion, at least ¼ and preferably at least ½ of the moisture is in hydrate form. A preferred moisture content is from 5 to 17% and the more preferred such content is from 10 to 15%. Any moisture not removable by the standard test mentioned above is considered to be a part of the compound in which it is present as a hydrate, e.g., a zeolite.

The total proportion of various adjuvants which may also be present in the detergent composition will usually be no more than 20%, preferably being limited to 15% and more preferably to 10%. Although water soluble sodium silicate has building properties, especially with respect to its action against magnesium ions in hard water, because it also acts as a binder the proportion thereof present will not be limited by the builder content proportions previously given and will be considered herein with other adjuvants for the present compositions. Usually it will constitute no more than 8% of the product, with a normal range of 1 to 5%, preferably 2 to 4%, e.g., 3%. The content of filler salt, such as sodium sulfate, when it is present, will also normally be limited, to no more than 10%, and will normally constitute from 0.5 to 5%, preferably 0.5 to 2%, e.g., 1 or 1.5% of the product. The percentage of proteolytic enzyme used will normally be from 0.1 to 2%, preferably 0.2 to 1%, e.g., 0.3%, and the percentage of optical brightener dye will be from 0.1 to 2%, preferably 0.1 to 0.5%, e.g., about 0.2%. Perfume content will normally be from 0.05 to 2%, preferably 0.1 to 1%, and more preferably 0.2 to 0.5%, e.g., about 0.3%. Among other adjuvants it may sometimes be desirable to have present small proportions of particular sequestering agents and flow promoters. Among such materials a preferred sequestrant is diethylenetriamine pentaacetic acid, magnesium salt but other diethylenetriamine acetates may be substituted for it. Magnesium silicate is a preferred flow promoter, which also may serve as a carrier for the sequestrant. Commercially, a mixture of such products is available comprising 15% of the magnesium DTPA and 85% of $MgSiO_3$ and when such is employed the proportion thereof is preferably from 0.1 to 1%, more preferably 0.1 to 0.5%, e.g., 0.2%. Proportions of the sequestrant (or stabilizer) may be from 0.01 to 0.2%, preferably 0.02 to 0.1%, and for the $MgSiO_3$ concentrations are in the range of 0.1 to 0.9%, preferably 0.2 to 0.5%. Amounts of other adjuvants employed will be such as to accomplish the purpose for which the adjuvant is included in the detergent composition but normally such proportions will not be in excess of 1 or 2% and generally will be within the range of 0.05 to 1%.

In addition to the detergent composition containing synthetic organic detergent, builder, bentonite and siliconate, with soap, bleach and adjuvants, also within the present invention are siliconate-treated bentonite, siliconate-treated detergent composition (without bentonite), siliconate-treated perborate and siliconate-treated enzyme. For the siliconate-treated bentonite the siliconate content will be from 0.2 to 10%, preferably 0.5 to 5% and more preferably 1 to 3%. For the corresponding detergent composition without bentonite and for the enzyme and perborate the proportions of siliconate will be the same as those for the final detergent composition but such proportions may be increased from 10 to 100%, depending on conditions and the proportions of the various adjuvants in the detergent composition.

To make the products of this invention known spray drying, agglomerating and mixing techniques (preferably all three) may be employed. Because such are not considered to be significant features of the invention they will be referred to only briefly herein. In the spray drying operation a crutcher mix containing various components desired to be present in the spray dried bead and sufficiently stable to withstand the crutching and spray drying operations, such as detergent, builder and suitable adjuvants, is spray dried from an aqueous crutcher mix, which normally will contain from about 40 to about 70 or 75% of solids, preferably 50 to 65% thereof, with the balance being water. The crutcher mix may contain the anionic detergent and a portion or all of the nonionic detergent, although usually no more than 5% of nonionic detergent (on the basis of the final product) will be in the crutcher (the rest, if any, being post-added). All of the builder or mixture of builders will normally be added in the crutcher, although this is not necessary. The bentonite is preferably separately agglomerated and is post-added to the spray dried product but sometimes it may be incorporated in the crutcher mix. Aqueous silicate solution, stable fluorescent brightening dye, soap and filler salt are usually added in the crutcher, together with any stable pigment and other colorants that may be employed. Instead of charging a neutralized detergent the crutcher may be utilized as a neutralizing vessel, in which anionic organic detergent acid is neutralized with aqueous caustic. Such acid, for example, may be dodecylbenzene sulfonic acid containing about 45 to 50% of active ingredient, which may be neutralized with an aqueous sodium hydroxide solution, such as one containing 38% $Na_2O$. If the alkylbenzene is sulfonated with sulfur trioxide the active ingredient content of the acid may be as high as 99%. A higher fatty acid mixture may also be neutralized in the crutcher with the detergent acid to produce a desired higher fatty acid soap-detergent mixture.

The crutcher mix may be spray dried in a conventional spray tower, utilizing either concurrent or countercurrent flow. Normally the mix will be at a temperature in the 20° to 80° C. range, preferably 40° to 70° C. and will be spray dried in a tower in which the drying air is at a temperature of 200° to 400° C., to produce spray dried beads of particle sizes in the range of No's. 10 to 100 (U.S. Sieve Series) sieves. Any particles that are outside the desired range may be removed by screening and may be reprocessed. The beads made have a bulk density in the range of 0.3 to 0.6 g./ml., e.g., 0.5 g./ml. They are of a moisture content in a range which may be as broad as about 3 to 20% but normally will be about 10 to 15%.

After production of the spray dried portion of the compositions other components thereof may be mixed with the beads or sprayed onto them (and onto other components of the product, when desired). Generally it will be preferred for the bentonite, enzyme, bleach, and any other particulate products, such as those in powder, agglomerate or prill form (except the siliconate), which are intended to be post-added to the spray dried beads, to be mixed with them, after which any liquids (including siliconate in solution) to be post-added may be sprayed onto the mixture. However, orders of post-addition of components may be varied and sometimes part of the particulate material may be post-added after one or more of the liquids. Two or more of the particulate materials may be pre-mixed before post-addition and similarly, mixtures of liquids may also be made.

Solvents may be employed for various components to be applied as liquids and in some cases emulsions may be employed. Thus, while the siliconate is definitely very preferably applied in solution form, in water, if a less soluble siliconate is employed it may be applied as an aqueous emulsion. In some instances it may be desirable to utilize the siliconate in an aqueous emulsion with perfume and/or nonionic detergent. However, it is much preferred first to coat the unperfumed detergent composition with an aqueous siliconate solution spray and subsequently to spray perfume onto the "siliconated" product. In some instances it may be desirable to extend the perfume with a suitable solvent, such as a comparatively odorless alkylate (hydrocarbon). Instead of spraying the siliconate onto the mixture of spray dried (or otherwise manufactured to similar product characteristics) detergent beads, bentonite agglomerate, enzyme prills or agglomerates, and perborate particles in mixture, the siliconate may be applied to such individual components separately or in various combinations. Such can be accomplished with separate sprays of siliconate, in which case the proportion thereof deposited on the different components may be readily controllable, or a single siliconate spray may be directed onto different feed streams of such components as they enter a suitable mixer. When nonionic detergent is post-added (and it will sometimes be preferred that all of the nonionic detergent be added in the crutcher so that the siliconate will be of greatest dispensing assisting effect) it may be sprayed onto or otherwise satisfactorily applied to the surfaces of the spray dried beads before admixing with the other particulate components of the final product and before application of siliconate spray thereto. Also, as previously indicated, the nonionic detergent, in liquid form, may be mixed with the siliconate and/or perfume to be sprayed onto the product, in which case it may act like an emulsifier.

The apparatus for effecting the various mixings and sprayings is known in the art and accordingly will not be described in detail herein. Spraying may be through conventional nozzles, usually of wide spray pattern design, but other types of spraying equipment may also be employed. The mixers may be of various designs but preferably include revolving inclined tubes or drums, inside which spraying may be effected. However, V-shaped blenders, especially those of continuous feed design, and other commercial powder blenders can also be satisfactory.

The amount of siliconate that will be sprayed onto the surfaces of the various particulate components of the detergent composition will be such that the final product includes a dispensing assisting proportion of the siliconate (or a derivative thereof). Because it is thought that the bentonite agglomerates can to some extent interfere with satisfactory dispensing of the particulate detergent composition from the feed chamber of an automatic washing machine (of the "European type"), it may be preferable for a greater proportion of siliconate to be applied to such bentonite agglomerate particles, e.g., up to 5%, when such is feasible. In some cases only the bentonite particles will be treated with the siliconate, in which instances the proportion of siliconate in the final detergent composition may often be decreased, e.g., by as much as 50%. Applications of the siliconate involve addition of moisture to the composition being treated, when the siliconate is in aqueous solution or emulsion (but not if in non-aqueous solution). Such can either be desirable or not, depending on the moisture content and the properties of the detergent composition and processing apparatus. Accordingly, the concentration of siliconate in the spray liquid may be adjusted. Of course, the greater the volume of the spray and the greater the dilution of the siliconate the more uniformly a spray may be distributed on the particulate material. On the other hand, if the product is borderline or too high in moisture concentration a dilute siliconate spray may exacerbate this condition. Generally the concentration of siliconate in the liquid will be at least 5%, and preferably will be at least 10%. Because the siliconate is completely miscible with water higher concentrations may be employed, which are usually within the ranges of 5 or 10 to 25 or 50%.

The various mixing and spraying operations will normally take place at about room temperature but operations in the range of 10° to 40° C., preferably 20° to 30° C., are preferred. The particle sizes of the materials being coated with siliconate will usually be like those of the final product, within the No's. 10 to 100 or 200 sieve range (the perborate and enzyme ranges may extend to No. 200). The agglomerated bentonite particles will be those resulting from agglomeration or compaction of more finely divided particles, such as those of which over 50% pass through a No. 200 sieve. Such particles will be essentially grit-free and will normally have from 0.05 to 3%, preferably 0.1 to 0.5 or 1% of siliconate, such as potassium methyl siliconate or sodium propyl siliconate, sprayed onto the surfaces thereof to at least partially coat such surfaces. They may be colored with a suitable dye or pigment, such as Acilan Brilliant Blue FFR, or such or other suitable colorant may be applied with the siliconate. The siliconate does not obscure the color. Sometimes the bentonite agglomerates may be larger than the other particles in the product, e.g., 10 to 50% greater in diameter, to accentuate their difference. In many instances the bentonite agglomerates will preferably be of sodium carbonate treated bentonite (such treatment improves the color of off-color clay) and will contain magnesium carbonate and/or calcium carbonate therein, resulting from such treatment. When the particles are only partially coated with siliconate it is desirable for at least 10% of the surface area (of the equivalent spheres) to be covered by the siliconate, and more preferably a greater percentage will be covered, e.g., 50%, to facilitate dispensing. Similar considerations and conditions apply when the enzyme, bleach and detergent particles are being treated, with the exception that in such cases a lesser proportion of siliconate may be employed than that used for coating bentonite agglomerates.

In the various cases mentioned above the coating of the solid siliconate will normally be on the outer 1% of the thicknesses of the particles. For example, for a particle that is one millimeter in thickness such a siliconate coating would be about 5 microns thick. Preferably the coating will be on the outer 0.5% of the particle bead diameter, more preferably the outer 0.2% thereof. Of course, when only partial coatings are applied and when greater percentages of siliconate are utilized, as when only the bentonite agglomerates are coated, the siliconate thicknesses will be greater, but preferably less than 2%. Normally, such thicknesses will be at least 0.05% of the particle thickness.

The products and processes of this invention possess many advantages, several of which have already been mentioned. With respect to the products, the application of siliconate to particle surfaces, even when the entire particle is not covered with the siliconate, improves the dispensing characteristics of such particle without having any adverse effects. Thus, detergent compositions of the types described herein, and the particulate components of such compositions mentioned, are easier to dispense from a charging compartment of an automatic washing machine of the European type than are control products untreated with siliconate. This difference is most pronounced with respect to the agglomerated bentonite particles. The tests for comparing such results are practical use tests, employing a variety of different makes of such European washing machines, with the evaluator noting the number of particles remaining in the charging compartment after a normal charging and dispensing operations or after repeated such operations. To accentuate the differences and make the test more difficult, the walls of the charging compartment are first wet to promote adherence to them of the bentonite (and other materials). To simulate such a test one may sprinkle equal weights of test and control product onto a wet horizontal surface, allow them to stand for one or two minutes, and then direct a gentle spray of water onto the particles for a measured time, e.g., 30 seconds, after which the numbers of particles may be compared. By such tests the products of this invention show a marked improvement over the controls; normally one may expect to obtain less than half the number of particles still adhering to the pre-moistened surfaces when the "experimental" product is used, compared to the control.

While most of the detergent will be charged to the washing tub in normal use of the automatic washing machine so that the retention of some particles in the charging chamber may not initially be more than psychologically objectionable, with repeated washings greater numbers may be retained, thereby changing the composition of the fabric softening detergent and possibly even significantly affecting the charge weight. Also, the appearance of the charging compartment with particles retained therein is unsatisfactory and can lead to consumer rejection of the product. Because of the different washing techniques employed in America, coating bentonite detergent particles with siliconate may not be as important but it is considered that the presence of the siliconate on the particle will assist in making the detergent more stable and more freely flowing, especially in damp conditions, and will help to counteract any gelation of the bentonite under such conditions.

In addition to promoting dispensing, the siliconate also has the desirable effect of preventing excessive foaming of the detergent composition in aqueous solution. The bentonite also helps to limit foaming and the combination is superior to the individual components. The siliconate also appears to have a stabilizing effect on enzymes and bleaches coated with it and helps to prevent interaction between perfume components and other detergent constituents, thereby helping to stabilize the perfume. It can also have such an effect on colorants. Yet, these various advantages are obtained without the disadvantages of the product being excessively hydrophobic, because it is initially water soluble. It does not interfere with the desired quick dissolving and dispersing of the detergent components and does not appear to cause an objectionable buildup of hydrophobic deposits on washed and softened laundry. It does not interfere with the particular softening effect of the hydrophilic bentonite and does not interfere with the good detergency of the composition. The detergent compositions resulting are excellent laundry detergents and effectively soften washed laundry, as has been established by comparative tests against similar compositions containing neither bentonite nor siliconate. The products are satisfactorily free flowing and of desired bulk density and appearance. They are also non-dusting, which may at least in part be attributable to the siliconate.

Processes in which siliconate solutions or emulsions are sprayed onto detergent, bentonite and other detergent component particles are easily carried out and do not require special equipment. Due to the water solubility of the siliconate it may be applied in aqueous solvent without adding other components to the detergent formula. Yet, it can also be emulsified or otherwise distributed with other detergent components. The processes lend themselves to modification to allow different concentrations of siliconate on different detergent components. The coating materials do not gel or thicken objectionably, do not block spray nozzles and do not form gummy deposits in the spraying and mixing equipment. The siliconate may be applied at room temperature, not requiring heating as is the case with some other protective coating materials. The siliconate can be retained principally on the surfaces of the particles, allowing less to be employed while still producing the desired dispensing assisting effect. Also, apparently due to the nature of the siliconate or derivative thereof on the detergent or component particle, it is effective even when the particle is not completely covered by it.

The following examples illustrate but do not limit this invention. Unless otherwise indicated, all parts are by weight and all temperatures are in °C.

EXAMPLE 1

A crutcher mix totalling 3,199.5 kilograms of material is made by reacting 364 kg. of dodecylbenzene sulfonic acid (Dobane JNQ [48.8% active ingredient]) and 167 kg. of hydrogenated fatty acids (16 to 18 carbon atoms per mol of fatty acid) with 47 kg. of caustic soda (38% $Na_2O$) in an aqueous medium containing a suitable proportion (to maintain the reaction) of 952 kg. of city water (300 p.p.m. hardness, as $CaCO_3$). The balance of such water is employed to cool the reaction mix, as desirable, and to dilute other components of the crutcher mix. Subsequently there are added to the crutcher 242 kg. of aqueous sodium silicate solution ($Na_2O$:$SiO_2$=1:2.4) at a 44.1% solids concentration, 7.5 kg. of fluorescent stilbene type brightener, 7 kg. of Sydex 808 (85% $MgSiO_3$ and 15% magnesium DTPA), 1,252 kg. of hydrated sodium tripolyphosphate (TPP "H"), 54 kg. of anhydrous sodium sulfate (99.5% pure) and 107 kg. of a nonionic detergent, which may be considered as the condensation product of 11 mols of ethylene oxide with one mol of higher fatty alcohol having 12 to 15 carbon atoms per mol.

The crutcher mix is heated for about an hour, with stirring, so that its temperature rises to about 55° C., after which it is pumped to a spray drying tower where it is sprayed at elevated pressure through multiple spray nozzles into drying air at a temperature of about 300° C. From the spray drying particles of a moisture content of about 12% result, most of which are within the No's. 10 to 100 sieve range. Particles outside this range are screened out.

63.1 Parts of the spray dried powder (bulk density of about 0.4 g./ml.) are then blended with 0.3 part of prilled proteolytic enzyme (Alcalase, of 2 Anson units per gram, although Maxatase P 440,000 may be substituted), 20 parts of granular sodium perborate and 16 parts of agglomerated bentonite. All such powders are of particle sizes within the particle size range for the spray dried detergent composition component but smaller particles of the enzyme and perborate may also be employed, down to about No. 200. The bentonite particles are composed of 82.3 parts of anhydrous bentonite, 16.1 parts of water, 1.5 parts of sodium silicate (previously described) and 0.06 part of Acilan Brilliant Blue dye, with the dye being applied to the surface of the particles. The bentonite particles are made by agglomeration of more finely divided particles of bentonite (Laviosa AGB) with the dilute sodium silicate solution (in the water), after which they are dyed. The bentonite employed is one which has been treated with sodium carbonate to replace calcium and magnesium therein with sodium (see the preceding specification for description of this material) and from which a natural content of gritty material (hard enough to be difficult to smash with a hammer) had been removed, after treatment, by centrifugal separation. The moisture content of suitable agglomerated bentonite may be varied and can be as low as 3%, when mixed with other components of the present softening detergent.

Onto the mixture of spray dried beads, enzyme, perborate and colored bentonite particles, in an inclined drum mixer, there is sprayed a mix of 0.5 part of the nonionic detergent, 0.25 part of Rhodorsil Siliconate 51 T (50% solution of potassium methyl siliconate) and 0.25 part of detergent perfume. The spraying is regulated so that the liquid sprayed evenly coats the particles in the mixer or tumbling drum to produce about 100 parts of uniform product.

The final product is of particle sizes within the range of No's. 10 to 60 sieve, a bulk density of about 0.5 g./ml. and a moisture content of about 12% (although on standing this may be reduced to about 9%). The particulate fabric softening detergent resulting is free flowing and attractive in appearance, with the somewhat larger (averaging 20 to 200% greater in diameter) blue agglomerated bentonite particles contrasting with the other white particles, and is non-dusting.

The product made is subjected to practical laundry testing and is found to be an excellent detergent with desirable fabric softening properties. When evaluated, it is noted that it is more readily dispensable, leaving fewer particles behind in the charging compartment of a European type automatic washing machine, than a control in which the siliconate coating is not present. This is especially important when the bentonite particles are larger, since they may tend more to adhere to wet chamber walls during dispensing.

In modifications of the above procedure the anionic detergent is replaced by equal weights, respectively, of sodium lauryl sulfate, sodium hydrogenated tallow alcohol sulfate and sodium tallow alcohol polyethoxy (3EtO) sulfate. Alternatively, mixtures of such materials, e.g., equal parts of sodium dodecylbenzene sulfonate and sodium hydrogenated tallow alcohol sulfate, are employed together. In all such cases the final detergent composition resulting is one which is an excellent textile softening laundry detergent. All such products are also of improved dispensing characteristics, when tested by the methods previously described. Similar results are also obtainable when, instead of the anionic detergent being varied, the nonionic detergent is changed, being replaced by a block copolymer of propylene oxide and ethylene oxide, such as Pluronic L-44 or L-62, nonyl phenol polyoxyethylene (12 EtO) glycol or a condensation product of $C_{12-15}$ fatty alcohol with 3 or 7 mols of ethylene oxide per mol, or with a mixture of two or more of such detergents, e.g., in equal parts.

When half or all of the sodium tripolyphosphate is replaced by NTA the final product is also a satisfactory detergent, with softening properties, and is of improved dispensing properties compared to a control of the same formula without the siliconate.

When the soap is omitted from the formula diminished foam control results but otherwise the product is acceptable and is like those previously described. When the sodium perborate is replaced by other bleaching agents, such as sodium persulfate and magnesium dimonoperoxyphthalate, good bleaching and cleaning by the product is still obtainable. When known activators for oxidizing agents are present bleaching may be effected by use of the composition at lower temperatures than those near the boil (which are normally employed in the processes of this example to obtain maximum bleaching activity). When it is desired to include more silicate in the product the amount of silicate is doubled by post-adding similarly sized hydrous sodium silicate particles with the other post-added particulate solids. When sodium propyl siliconate is substituted for potassium methyl siliconate comparable products are obtainable and this is also the case when siliconates of lesser degrees of water solubility are employed in replacement of some, e.g., 25%, of the other siliconates.

EXAMPLE 2

The procedures of Example 1 are varied by applying the siliconate, in aqueous solution (20% solids), as a finely divided spray (preferably with the spray droplets being "micron sized", e.g., 1 to 50 or 1 to 10 microns in diameter), or otherwise as satisfactorily small sized liquid droplets, to each of the particulate components to be blended together separately before such blending. The various coated particles are all of bulk densities in the prescribed range (0.3 to 0.6 g./ml., e.g., 0.5 g./ml.). Subsequently, the perfume is similarly sprayed onto the mix. The nonionic detergent is not post-sprayed but instead, is incorporated in the crutcher mix. The resulting product is one which is also of improved dispensing properties. The siliconate coated agglomerated bentonite, spray dried detergent composition beads (without bentonite), enzyme and perborate can all be separately produced and stored, and subsequently are useful for formulating fabric softening detergents of different compositions and different desired properties, e.g., coated bentonite plus uncoated spray dried beads.

EXAMPLE 3

A softening detergent like that of the first formula of Example 1 is made from a crutcher mix of 10.24 parts of the dodecylbenzene sulfonic acid, 2.81 parts of the hydrogenated fatty acid, 0.81 part of the caustic soda, 26.54 parts of water, 37.2 parts of pentasodium tripolyphosphate (hydrated), 6.8 parts of sodium silicate solution, 0.21 part of fluorescent brightener, 1.46 parts of sodium sulfate and 3.0 parts of the nonionic detergent, added sequentially. This is spray dried by the method described in Example 1 to produce 62.5 parts of a product of similar bulk density and particle size. The spray dried particles are then mixed with 0.3 part of proteolytic enzyme, 20.0 parts of the sodium perborate granules, 16.0 parts of the agglomerated bentonite and 0.2 part of Sydex 808, and onto the tumbling powder mix there is sprayed a blend of 0.3 part of the detergent perfume and 0.4 part of $C_{10-13}$ linear alkylate, and 0.15 part of potassium methyl siliconate is sprayed onto the product in suitable liquid state, preferably dissolved in water (50% concentration). The product made is of better dispensing properties for dispensing from the charging compartment of an automatic washing machine in normal use. It exhibits a slightly greater foaming tendency than the similar product of Example 1.

When, instead of employing an agglomerated sodium carbonate-treated Italian bentonite from which grit has been removed, as in Example 1, a competitive product (Winkelmann agglomerate) or a Wyoming type bentonite, such as that sold under the trade name Mineral Colloid No. 101 (formerly Thixogel No. 1) is employed, similar final products are obtained which are good softening detergents and are readily dispensed. Also, when other lower alkyl siliconates, such as sodium propyl siliconate, are utilized, comparable results are obtainable. When the Acilan Blue dye, used to color the bentonite agglomerates, is replaced by ultramarine blue, good coloring and bluing effects are also obtained. Similarly, when the siliconate is applied only to the agglomerated bentonite, with the total proportion of siliconate in the product being the same, or 50% less in some cases, the properties of the detergent resulting are similar to those previouly described and dispensing is also improved, compared to a control.

EXAMPLE 4

When the proportions of the various components in the preceding Examples are modified ±10%, ±20% and ±30%, maintaining them within the ranges previously given and keeping the ratios of anionic detergent to nonionic detergent within the range of about 1:1 to 3:1, the ratio of total detergent content to builder content within the range of about 1:3 to 1:8 and the ratio of sodium bentonite to total detergent within the range of about 1:1 to 2:1, products of properties similar to those described in Example 1 are obtained. Such is also the case when the water soluble builder salt(s) of Example 1 are replaced with zeolite A (20% hydrated) and when any of a variety of synthetic anionic and nonionic detergents is employed in mixture, optionally with an amphoteric detergent, such as one of the Miranol type. Also, the invention may be used to improve the dispensing properties of various other bentonites and particulate detergent compositions of widely different formulas, densities (0.2 to 0.9 g./ml.) and sizes (preferably No. 10-40 sieve).

The invention has been described with respect to various illustrations of preferred embodiments thereof but is not to be limited to these because one of ordinary skill in the art, with the present specification before him, will be able to utilize substitutes and equivalents without departing from the invention.

What is claimed is:

1. Particles of enzyme of sizes in the range of No's. 10 to 200, U.S. Sieve Series, at least partially coated with a salt of a lower alkyl siliconic acid and/or polymerization product(s) thereof formed therefrom on storage.

2. Enzyme particles according to claim 1 which are coated with from 0.05 to 1% of potassium methyl siliconate.

* * * * *